United States Patent
Bhayankara et al.

(10) Patent No.: US 9,838,493 B2
(45) Date of Patent: Dec. 5, 2017

(54) DYNAMIC ROUTING OF AUTHENTICATION REQUESTS

(75) Inventors: Ranganath Prativadi Bhayankara, Burlington (IN); Shailesh Patel, San Jose, CA (US); Sunil Menon, San Jose, CA (US)

(73) Assignee: Extreme Networks, Inc., San Jose, CA (US)

( * ) Notice: Subject to any disclaimer, the term of this patent is extended or adjusted under 35 U.S.C. 154(b) by 0 days.

(21) Appl. No.: 13/591,105

(22) Filed: Aug. 21, 2012

(65) Prior Publication Data

US 2014/0059650 A1    Feb. 27, 2014

(51) Int. Cl.
*G06F 7/04* (2006.01)
*H04L 29/08* (2006.01)
*G06F 21/44* (2013.01)
*H04L 29/06* (2006.01)

(52) U.S. Cl.
CPC .......... *H04L 67/2819* (2013.01); *G06F 21/44* (2013.01); *H04L 63/0892* (2013.01); *H04L 67/327* (2013.01); *H04L 63/0281* (2013.01)

(58) Field of Classification Search
CPC ...... H04L 29/06; H04L 63/0815; H04L 63/08
See application file for complete search history.

(56) References Cited

U.S. PATENT DOCUMENTS

| | | | |
|---|---|---|---|
| 2007/0106892 A1* | 5/2007 | Engberg | 713/168 |
| 2008/0028445 A1* | 1/2008 | Dubuc | H04L 63/08 726/5 |
| 2008/0281737 A1* | 11/2008 | Fajardo | 705/35 |
| 2011/0202989 A1* | 8/2011 | Otranen | H04L 63/0815 726/8 |
| 2012/0177003 A1* | 7/2012 | Chan | H04W 36/0066 370/331 |

\* cited by examiner

*Primary Examiner* — Brandon Hoffman
(74) *Attorney, Agent, or Firm* — Haley Guiliano LLP

(57) ABSTRACT

Methods, systems, and computer readable media for dynamically routing authentication requests are described. An embodiment can include receiving, at one or more computing devices, a network authentication request. An embodiment can also include creating, at the one or more computing devices, an authentication context based on information in the authentication request. An embodiment can also include dynamically routing, using the one or more computing devices, the authentication request to an authentication server.

16 Claims, 2 Drawing Sheets

DYNAMIC ROUTING OF AUTHENTICATION REQUESTS

TECHNICAL FIELD

Embodiments relate generally to network authentication, and more particularly, to methods, systems and computer readable media for dynamic routing of authentication requests.

BACKGROUND

Remote Authentication Dial In User Service (RADIUS) is a networking protocol that can provide authentication, authorization, and accounting (AAA) management for a network. An authentication proxy can be used to route authentication requests to an authentication server (e.g., a RADIUS server). Some authentication proxies may route authentication requests in a static way based on simplistic criteria, such as domain.

SUMMARY

One or more embodiments can include a method for dynamically routing authentication requests. The method can include receiving, at one or more computing devices, a network authentication request. The method can also include creating, at the one or more computing devices, an authentication context based on information in the authentication request. The method can further include dynamically routing, using the one or more computing devices, the authentication request to an authentication server.

The method can also include learning, at the one or more computing devices, information from the authentication request. The information can be used to create the authentication context. Dynamically routing can include determining a routing for the authentication request based on the authentication context.

The method can further include receiving a response to the authentication request. The response can include user authentication. The method can further include authorizing access to one or more systems based on the user authentication. The authentication context can include one or more of a location of a device, a mode of access, an SSID, a user identity, a current load on one or more authentication servers, a MAC address, an IP address, health and security information and device type. The mode of access can include one of wired or wireless access. The method can also include setting a threshold for each portion of the authentication context.

One or more embodiments can include a system with a processor coupled to a nontransitory computer readable medium having stored thereon software instructions that, when executed by the processor, cause the processor to perform a series of operations.

The operations can include receiving a network authentication request and learning information from the authentication request. The operations can also include creating an authentication context based on information in the authentication request. The information can be used to create the authentication context.

The operations can further include dynamically routing the authentication request to an authentication server. The dynamically routing can include determining a routing for the authentication request based on the authentication context.

The operations can also include receiving a response to the authentication request. The response can include user authentication. The operations can further comprise authorizing access to one or more systems based on the user authentication.

The authentication context can include one or more of a location of a device, a mode of access, an SSID, a user identity, a current load on one or more authentication servers, a MAC address, an IP address, health and security information and device type. The mode of access can include one of wired or wireless access, or remote access (for example VPN).

The operations can further comprise setting a threshold for each portion of the authentication context.

One or more embodiments can include a nontransitory computer readable medium having stored thereon software instructions that, when executed by a processor, cause the processor to perform a series of operations. The operations can include receiving a network authentication request and learning information from the authentication request.

The operations can also include creating an authentication context based on information in the authentication request. The information can be used to create the authentication context.

The operations can further include dynamically routing the authentication request to an authentication server. The dynamically routing can include determining a routing for the authentication request based on the authentication context.

The operations can further comprise receiving a response to the authentication request. The response can include user authentication.

The operations can further comprise authorizing access to one or more systems based on the user authentication. The authentication context can include one or more of a location of a device, a mode of access, an SSID, a user identity, a current load on one or more authentication servers, a MAC address, an IP address, health and security information and device type. The mode of access can include one of wired or wireless access. The operations can further comprise setting a threshold for each portion of the authentication context.

DETAILED DESCRIPTION

In general, an embodiment can include a method, system or computer readable medium for dynamic routing of authentication requests based on an authentication context. The authentication context can include a location of a device, a mode of access, an SSID, a user identity, a current load on one or more authentication servers, a MAC address, an IP address, health and security information, a device type and/or the like.

Figure 1:
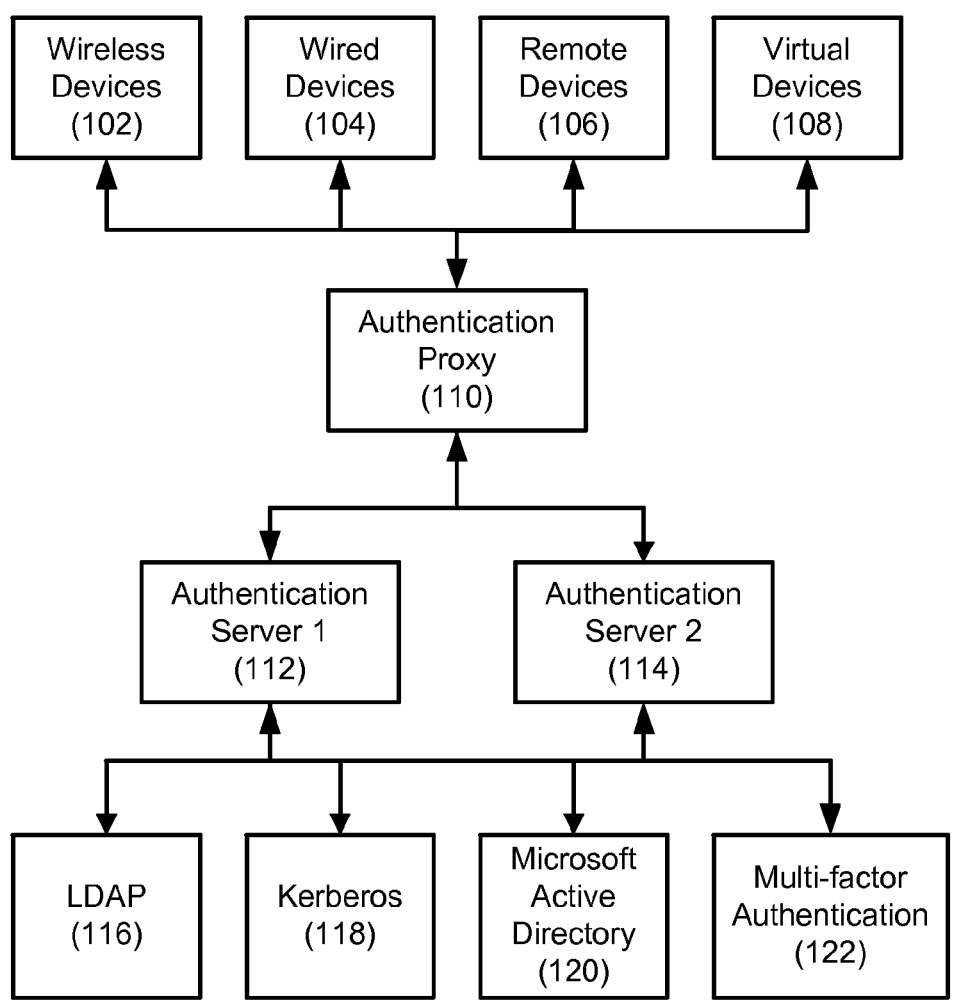
FIG. 1 is a diagram of an example network in accordance with at least one embodiment.

As shown in FIG. 1, a network 100 can include wireless devices 102, wired devices 104, remote devices 106, and virtual devices 108. The various devices (102-108) can send authentication requests to an authentication proxy 110.

The authentication proxy 110 can forward the authentication request to one of plurality of authentication servers (112 and 114), which in turn can access an authentication service such as LDAP 116, Kerberos 118, Microsoft Active Directory 120, a Multi-factor Authentication 122 or the like. The authentication servers (112 and 114) can include an Avaya Identity Engine Ignition Server, for example.

The authentication requests can be in one of a plurality of authentication protocols such as RADIUS, terminal access controller access-control system (TACACS+), password authentication protocol (PAP), challenge handshake authentication protocol (CHAP), TTLS-PAP, MS-CHAPv2, or an extensible authentication protocol (EAP) protocol such as protected extensible authentication protocol (PEAP), EAP-MD5, EAP-MSCHAPv2, PEAP/EAP-MSCHAPv2, EAP-TLS, PEAP/EAP-TLS, EAP-GTC. The authentication protocol can also include MAC address authentication, Windows machine authentication and RSA SecurID or the like.

In addition to the authentication stores mentioned above (e.g., 116-122), the user stores can also include RADIUS Server, Ignition Server's embedded user store and/or RSA Authentication Manager.

In operation, the authentication proxy can dynamically route authentication requests (e.g., using a method similar that described below in connection with FIG. 2).

Figure 2:
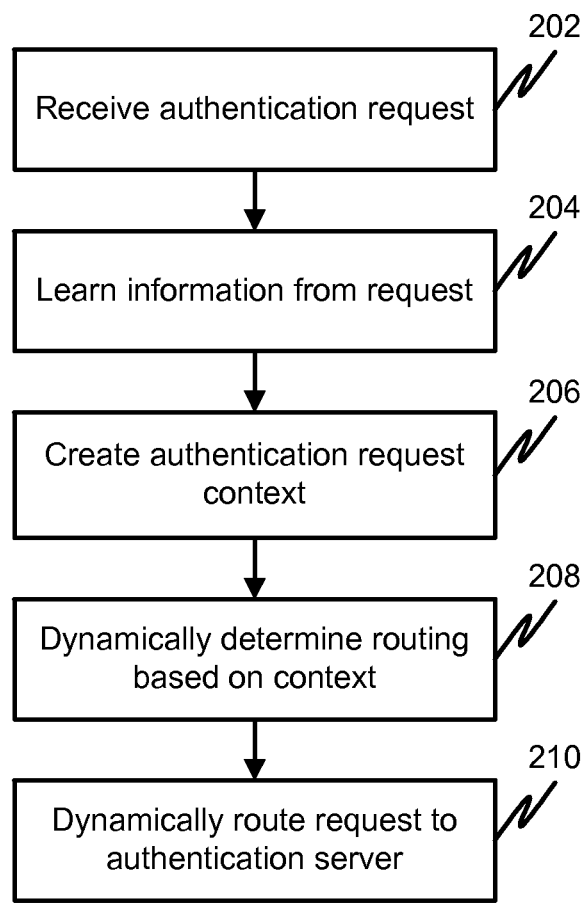
FIG. 2 is a flow chart showing an example method for dynamic routing of authentication requests in accordance with at least one embodiment.

FIG. 2 is a flow chart showing an example method for dynamic routing of authentication requests. Processing begins at 202, where an authentication proxy system receives an authentication request. Processing continues to 204.

At 204, the system can learn information from the request. The information can include a location of a device, a mode of access (e.g., wired or wireless), an service set identifier (SSID), a user identity, a current load on one or more authentication servers (e.g., 112 and/or 114), a MAC address, an IP address, health and security information and device type. Processing continues to 206.

At 206, an authentication context is created using one or more of the items of information learned from the request. Processing continues to 208.

At 208, the system dynamically determines a routing for the authentication request based on the authentication context. This can include applying threshold or limits to the items of information in the authentication context. Processing continues to 210.

At 210, the authentication request is dynamically routed to an authentication server (e.g., 112 or 114 of FIG. 1) based on the authentication context. Also, routing may be based on device type, for example, all corporate assets may be authenticated at a first authentication server and personal assets may be authenticated at a second authentication server.

Typical routing may be based on radius or diameter, however an embodiment in accordance with the disclosure can perform dynamic routing based on authentication context, which can be considered intelligent in the sense that the routing is performed based on an analysis of one of more authentication context items of information.

In response to the authentication request, an authentication server may respond with a user authentication which can be used to grant access to one or more systems.

It will be appreciated that the modules, processes, systems, and sections described above can be implemented in hardware, hardware programmed by software, software instructions stored on a nontransitory computer readable medium or a combination of the above. A system for edge network virtualization encapsulation, for example, can include a processor configured to execute a sequence of programmed instructions stored on a nontransitory computer readable medium. For example, the processor can include, but not be limited to, a personal computer or workstation or other such computing system that includes a processor, microprocessor, microcontroller device, or is comprised of control logic including integrated circuits such as an Application Specific Integrated Circuit (ASIC). The instructions can be compiled from source code instructions provided in accordance with a programming language such as Java, C, C++, C#.net, assembly or the like. The instructions can also comprise code and data objects provided in accordance with, for example, the Visual Basic™ language, or another structured or object-oriented programming language. The sequence of programmed instructions, or programmable logic device configuration software, and data associated therewith can be stored in a nontransitory computer-readable medium such as a computer memory or storage device which may be any suitable memory apparatus, such as, but not limited to ROM, PROM, EEPROM, RAM, flash memory, disk drive and the like.

Furthermore, the modules, processes systems, and sections can be implemented as a single processor or as a distributed processor. Further, it should be appreciated that the steps mentioned above may be performed on a single or distributed processor (single and/or multi-core, or cloud computing system). Also, the processes, system components, modules, and sub-modules described in the various figures of and for embodiments above may be distributed across multiple computers or systems or may be co-located in a single processor or system. Example structural embodiment alternatives suitable for implementing the modules, sections, systems, means, or processes described herein are provided below.

The modules, processors or systems described above can be implemented as a programmed general purpose computer, an electronic device programmed with microcode, a hard-wired analog logic circuit, software stored on a computer-readable medium or signal, an optical computing device, a networked system of electronic and/or optical devices, a special purpose computing device, an integrated circuit device, a semiconductor chip, and/or a software module or object stored on a computer-readable medium or signal.

Embodiments of the method and system (or their subcomponents or modules), may be implemented on a general-purpose computer, a special-purpose computer, a programmed microprocessor or microcontroller and peripheral integrated circuit element, an ASIC or other integrated circuit, a digital signal processor, a hardwired electronic or logic circuit such as a discrete element circuit, a programmed logic circuit such as a PLD, PLA, FPGA, PAL, or the like. In general, any processor capable of implementing the functions or steps described herein can be used to implement embodiments of the method, system, or a computer program product (software program stored on a nontransitory computer readable medium).

Furthermore, embodiments of the disclosed method, system, and computer program product (or software instructions stored on a nontransitory computer readable medium) may be readily implemented, fully or partially, in software using, for example, object or object-oriented software development environments that provide portable source code that can be used on a variety of computer platforms. Alternatively, embodiments of the disclosed method, system, and computer program product can be implemented partially or fully in hardware using, for example, standard logic circuits or a VLSI design. Other hardware or software can be used to implement embodiments depending on the speed and/or efficiency requirements of the systems, the particular function, and/or particular software or hardware system, microprocessor, or microcomputer being utilized. Embodiments of the method, system, and computer program product can be implemented in hardware and/or software using any known or later developed systems or structures, devices and/or software by those of ordinary skill in the applicable art from the function description provided herein and with a general basic knowledge of the software engineering and computer networking arts.

Moreover, embodiments of the disclosed method, system, and computer readable media (or computer program product) can be implemented in software executed on a programmed general purpose computer, a special purpose computer, a microprocessor, or the like.

It is, therefore, apparent that there is provided, in accordance with the various embodiments disclosed herein, systems, methods and computer readable media for dynamic routing of authentication requests.

While the disclosed subject matter has been described in conjunction with a number of embodiments, it is evident that many alternatives, modifications and variations would be, or are, apparent to those of ordinary skill in the applicable arts. Accordingly, Applicants intend to embrace all such alternatives, modifications, equivalents and variations that are within the spirit and scope of the disclosed subject matter.

What is claimed is:

1. A method for dynamically routing authentication requests, the method comprising:
   receiving, at one or more computing devices, a network authentication request;
   learning information from the authentication request, wherein the information includes three or more of a device location, a mode of access, a service set identifier (SSID), a current load on one or more authentication servers, health information, security information, and device type;
   creating, at the one or more computing devices, an authentication context based on the information in the authentication request such that the authentication context includes three or more of the device location, the mode of access, the SSID, the current load on the one or more authentication servers, the health information, the security information, and the device type;
   determining a routing for the network authentication request based on the authentication context; and
   dynamically routing, using the one or more computing devices, the authentication request to an authentication server based on the determined routing.

2. The method of claim 1, wherein dynamically routing includes determining a routing for the authentication request based on the authentication context.

3. The method of claim 1, further comprising receiving a response to the authentication request, wherein the response includes user authentication.

4. The method of claim 3, further comprising authorizing access to one or more systems based on the user authentication.

5. The method of claim 1, wherein the mode of access includes one of wired or wireless access.

6. The method of claim 1, further comprising setting a threshold for each item of information used to create the authentication context.

7. A system comprising:
   a processor coupled to a non-transitory computer readable medium having stored thereon software instructions that, when executed by the processor, cause the processor to perform a series of operations including:
   receiving a network authentication request;
   learning information from the authentication request, wherein the information includes three or more of a device location, a mode of access, a service set identifier (SSID), a current load on one or more authentication servers, health information, security information, and device type;
   creating an authentication context based on the information in the authentication request such that the authentication context includes three or more of the device location, the mode of access, the SSID, the current load on the one or more authentication servers, the health information, the security information, and the device type;
   determining a routing for the network authentication request based on the authentication context; and
   dynamically routing the authentication request to an authentication server, wherein the dynamically routing includes determining a routing for the authentication request based on the authentication context.

8. The system of claim 7, wherein the operations further include receiving a response to the authentication request, wherein the response includes user authentication.

9. The system of claim 8, wherein the operations further comprise authorizing access to one or more systems based on the user authentication.

10. The system of claim 7, wherein the mode of access includes one of wired or wireless access.

11. The system of claim 7, further comprising setting a threshold for each portion of the authentication context.

12. A non-transitory computer readable medium having stored thereon software instructions that, when executed by a processor, cause the processor to perform operations comprising:
   receiving a network authentication request;
   learning information from the authentication request, wherein the information includes three or more of a device location, a mode of access, a service set identifier (SSID), a current load on one or more authentication servers, health information, security information, and device type;
   creating an authentication context based on the information in the authentication request such that the authentication context includes three or more of the device location, the mode of access, the SSID, the current load on the one or more authentication servers, the health information, the security information, and the device type;
   determining a routing for the network authentication request based on the authentication context; and
   dynamically routing the authentication request to an authentication server, wherein the dynamically routing includes determining a routing for the authentication request based on the authentication context.

13. The computer readable medium of claim 12, wherein the operations further comprise receiving a response to the authentication request, wherein the response includes user authentication.

14. The computer readable medium of claim 13, wherein the operations further comprise authorizing access to one or more systems based on the user authentication.

15. The computer readable medium of claim 12, wherein the mode of access includes one of wired or wireless access.

16. The computer readable medium of claim 12, wherein the operations further comprise setting a threshold for each portion of the authentication context.

* * * * *